(12) United States Patent
Klinke

(10) Patent No.: US 8,430,218 B2
(45) Date of Patent: Apr. 30, 2013

(54) LIFTING COLUMN PREFERABLY FOR HEIGHT ADJUSTABLE TABLES AND METHOD FOR MANUFACTURING THEREOF

(75) Inventor: Norbert Klinke, Augustenborg (DK)

(73) Assignee: Linak A/S, Nordborg (DK)

( * ) Notice: Subject to any disclaimer, the term of this patent is extended or adjusted under 35 U.S.C. 154(b) by 674 days.

(21) Appl. No.: 10/497,691

(22) PCT Filed: Dec. 2, 2002

(86) PCT No.: PCT/DK02/00809
§ 371 (c)(1),
(2), (4) Date: Jun. 4, 2004

(87) PCT Pub. No.: WO03/047389
PCT Pub. Date: Jun. 12, 2003

(65) Prior Publication Data
US 2005/0016806 A1    Jan. 27, 2005

(30) Foreign Application Priority Data
Dec. 5, 2001 (DK) .................................. 2001 01808

(51) Int. Cl.
*F16F 9/32* (2006.01)
(52) U.S. Cl.
USPC .................. 188/300; 188/322.19; 267/64.12; 248/161

(58) Field of Classification Search .................. 188/300, 188/312, 371, 322.19; 267/64.12, 64.16, 267/131; 248/161, 562, 188.2, 622, 631
See application file for complete search history.

(56) References Cited

U.S. PATENT DOCUMENTS

| | | | | |
|---|---|---|---|---|
| 5,078,351 A | * | 1/1992 | Gualtieri | 248/161 |
| 5,224,429 A | * | 7/1993 | Borgman et al. | 108/147 |
| 5,462,248 A | * | 10/1995 | Bauer | 248/161 |
| 5,570,873 A | | 11/1996 | Bauer et al. | 267/64.12 |
| 5,702,083 A | | 12/1997 | Lai | 248/404 |
| 5,944,290 A | | 8/1999 | Fuhrmann et al. | 248/161 |

FOREIGN PATENT DOCUMENTS

DE    10065247 A1 *  7/2002
WO    WO-02/39848 A1 *  5/2002

* cited by examiner

*Primary Examiner* — Pamela Rodriguez
(74) *Attorney, Agent, or Firm* — Dykema Gossett PLLC

(57) ABSTRACT

In lifting columns (1) for tables and similar articles of furniture and consisting of pipe profiles (2a, 2b) with intermediate slides (8), it is a problem that the profiles (2a, 2b) have relatively great dimensional tolerances. This means that the gap between two successive sections may vary relatively much, which causes a great play in the column. This is solved in that at least one of these sections (2a) at one of the slides (8) is formed with a local deformation of the wall inwards toward the slide to press the slide inwards against the following section (2b). The dimensional tolerances may be neutralized by suitable arrangement and selection of deformations as well as the force with which the deformation is made.

6 Claims, 2 Drawing Sheets

LIFTING COLUMN PREFERABLY FOR HEIGHT ADJUSTABLE TABLES AND METHOD FOR MANUFACTURING THEREOF

BACKGROUND OF THE INVENTION

1. Field of the Invention

The present invention relates to a lifting column, preferably for height-adjustable tables, the column consisting of sections of pipe profiles telescopically arranged inside each other, with slides arranged between the individual sections, and the invention also relates to a method of manufacturing such a column.

2. The Prior Art

The focusing in recent years on working environment has resulted in a trend toward the desirability of making also common work tables, such as desks, adjustable in height, in addition to more sophisticated tables and equipment. This means that the cost of the height adjustment is a decisive factor. As a result, a new field of products has emerged, viz. lifting columns for tables, where it is intended to meet the specific requirements that are associated with tables.

The columns are usually made from steel pipes or/and extruded aluminium pipes which are cut to desired lengths. The individual sections have interposed between them slides of plastics in the form of bushings and/or separate bricks, and there are also examples of slides in the form of axially extending strips.

From an overall point of view, the pipes are vitiated by two inherent drawbacks. One drawback is a relatively great dimensional tolerance, which results in great variations in the gap between the sections. This in turn means that a relatively great play may occur between the sections. The play causes the table to be unstable, which is impermissible from a user point of view. Machining of the pipes to reduce the dimensional tolerances will make the columns unacceptably expensive.

Adjustable slides have been developed to avoid the play, which may be adapted to the current width of gap, cf. e.g. DK 171 903 B1, DE 298 12 762 U1. In both cases, machining of the sections is required, and DE 298 12 762 U1 additionally requires a special configuration of the sections. In the first-mentioned case, holes have to be drilled and threads to be made for the adjustment screw of the slides, and in the last-mentioned case transverse grooves for the central rib of the slides have to be made internally in the sections. This, of course, adds to the costs of the columns.

The other drawback is that during the manufacturing process the pipes may be twisted around their longitudinal axis, which means that the cross-section is out of angle. This causes the gap between two sections to be non-uniform, unless by chance they have the same angle of twist. Not only does the gap have a non-uniform width, but it will also vary depending on how much or how little the two sections are twisted relative to each other. It gets even worse if two sections are twisted in their separate directions. The object of the invention is to provide a lifting column of the type stated in the opening paragraph with simple slide devices, simple mounting of these and without noticeable machining of the sections.

SUMMARY OF THE INVENTION

This is achieved according to the invention in that at least one of the sections at one of the slides is formed with a local deformation of the wall inwardly towards the slide to press the slide against the following section. Basically, solid slides are used, having a thickness which, when the dimensional tolerances are disregarded, fits the gap between two successive sections. The local deformation of the section is exclusively intended to compensate for dimensional tolerances so that the slide will be firmly engaged with the following section which is to slide thereon, so that the sections are free of play or practically free of play. An optimum play-free state is achieved by making deformations of such a size that the slides are biased between the sections.

Depending on whether the slide is to act against an internal section or a surrounding section, the deformation is made on the external or the internal side of the section, respectively. It is evident that, during the deformation, it is possible to introduce a core to prevent deformation of the internal section or an external stop to prevent deformation of the surrounding section when deformation is performed from the inside and outwards.

In certain embodiments of slides, e.g. in the form of bushings, it is an advantage that these are formed with at least a flap-shaped wall portion, and that the deformation is made at this. The flap-shaped wall portion as such is caused to contact the subsequent section more easily and more properly.

Arrangement of deformations so that they are disposed opposite each other has the evident advantage that each of them is only to compensate for half the dimensional tolerance.

In a special embodiment of the invention, the deformations are disposed opposite each other on the sides of the column which are intended to be positioned in parallel with the user—in case of tables this means with the front edge of the table that faces toward the user. The reason is that it has been found that the users are essentially only inconvenienced by play in the transverse direction relative to the user, while only in rare cases is play in the longitudinal direction regarded as a real problem.

It has been found that deformations in the form of spherical impressions, preferably ball impressions, are fully sufficient to compensate for dimensional tolerances. Deformations of this type have the additional advantage that they do not interfere with the visual appearance of the column, which is a decisive element in furniture. On the side where the ball impression is made, it is not very visible, but the bulge is larger on the rear side.

In a method of manufacturing a lifting column, preferably for height-adjustable tables, the column is manufactured by arranging sections of pipe profiles telescopically inside each other and by arranging slides between the individual sections, and by forming at least one of the sections at one of the slides with a local deformation of the wall toward the slide to press the slide against the following section. The deformation must be of such a nature that the wall toward the slide bulges against the slide and pushes it into engagement with the following section.

In a special method, two successive sections are arranged inside each other at least so as to overlap each other in the area of an inserted slide, and the deformation is then made with a predetermined force. The force with which the deformation is to be made, may be adjusted on the basis of the nature of the material and the occurring dimensional tolerance, so that the slide is firmly engaged, expediently biased between two sections with a desired pressure.

BRIEF DESCRIPTION OF THE DRAWINGS

The invention will be explained more fully below with reference to the accompanying drawing. In the drawing.

DETAILED DESCRIPTION OF THE PREFERRED EMBODIMENT

Figure 1:
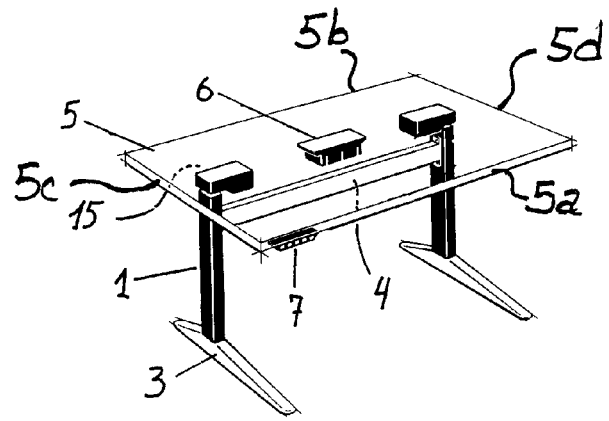
FIG. 1 shows a desk where the tabletop is shown to be transparent.
Figure 2:
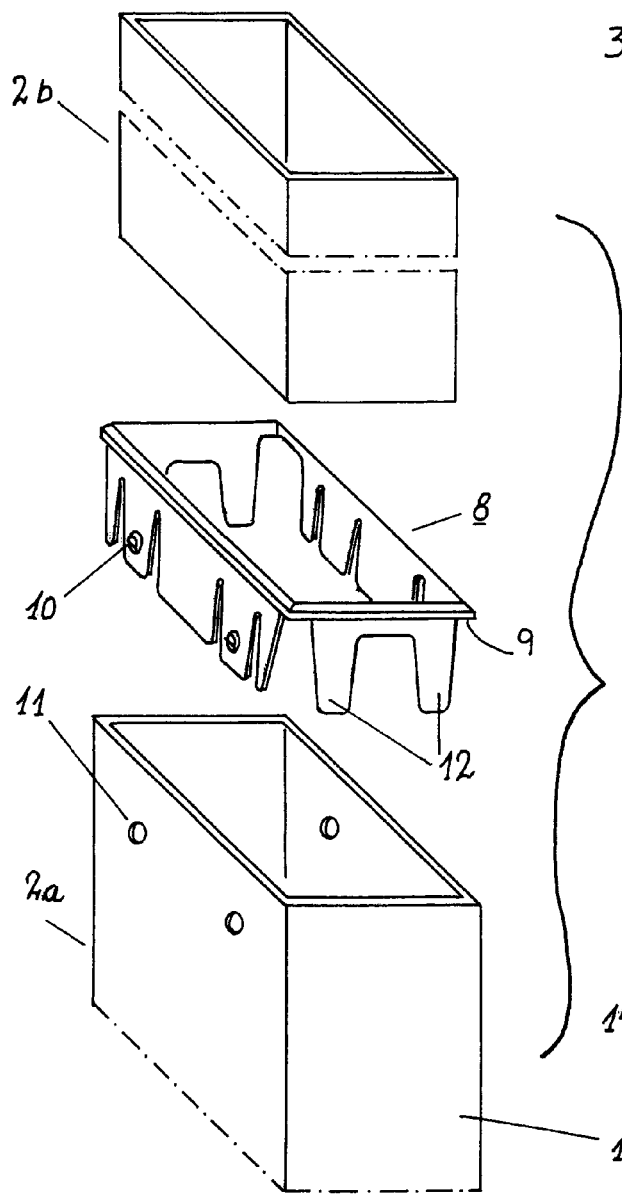
FIG. 2 shows an exploded view of a portion of a lifting column.
Figure 4:
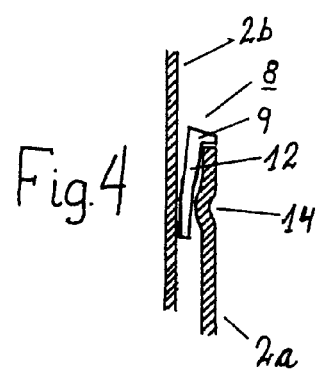
FIG. 4 shows a cross-section in the narrow side of the lifting column.
Figure 3:
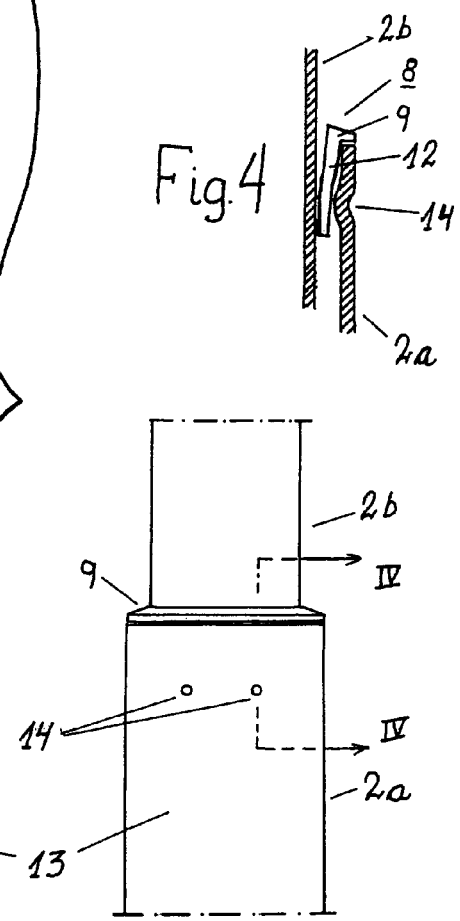
FIG. 3 shows a portion of the lifting column, seen from one narrow side.

The desk shown in FIG. 1 comprises a lifting column 1 at each end. The lifting columns 1 comprise two sections 2a, 2b and are firmly mounted in a foot 3 with the lower end of the outer section 2a and are moreover interconnected with a cross member 4 at the upper end. The tabletop 5, which defines a front edge 5a, a rear edge 5b, and opposite side edges 5c, 5d, is mounted on the upper end of the inner section 2b of the lifting columns. The movement of the columns is caused by an incorporated spindle/nut unit which is driven by an electric motor connected to a control box 6 with a power supply. The box also contains a control which is activated by a control panel 7 arranged at the front edge of the table. A housing 15 is provided at the end of the inner section 2b, and this housing accommodates an electric motor and gears as well as typically also end stop switches. As will appear, the two sections 2a, 2b in the form of steel profiles of the column have a substantially rectangular cross-section. The upper end of the outer section 2a has secured thereto a slide 8 with a collar 9 with which it rests on the upper edge of the section 2a, and thereby also serves as the top frame to cover the gap between the two sections 2a, 2b. The slide 8 includes spaced wall portions (tongues) 12 which extend in a longitudinal direction of the column and is secured with bosses 10 which are seated in holes 11 in the section 2a. The bosses 10 are kept in place in the holes in that the internal section 2b slides on the rear side of the flaps on which the bosses are seated. When the slide 8 has been mounted and the internal section 2b has been inserted into the external section 2a through the slide 8, a deformation is made on the external side of the opposed narrow sides 13 of the outer section 2a with a predetermined force. The deformation is made as two sets of ball impressions 14 positioned at their respective flap-shaped wall portion 12 on the slide 8 so that a corresponding wall portion 12 is pressed firmly against the outer side of the internal section 2b, as indicated in FIG. 4. The deformation takes place freely without the use of a core tool as a stop, and the impression is so large as to produce an elastic biasing of the slide between the two steel profiles. This ensures an optimum state without play, just as it compensate for wear.

The slide has a thickness which, when dimensional tolerances are disregarded, fills the gap between the outer and inner sections 2a, 2b in the column. The deformation 14 exclusively serves to neutralize the dimensional tolerances. The slide may be selected with a thickness which, on the basis of the dimensional tolerances, just fits the smallest gap width that may occur. Generally, the slides are typically made of a suitable plastics material.

Figure 5:
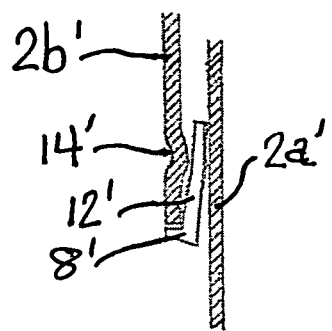
FIG. 5 shows a cross-section of an outer column section and an inner column section when the slide therebetween is pressed against the outer column section by outwardly-extending deformation in the inner column section.

FIG. 5 shows how outwardly-extending deformations 14' from an inner section 2b' will press wall portions 12' of a slide 8' against an outer section 2a'.

The invention thus provides a lifting column 1 which is free from play in the transverse direction of the table insofar as the tongues 12 and deformations 14 are located on sides of the section 2a which are parallel to the front 5a and the rear edge 5b of the table top 5. Play in the longitudinal direction of the table may be obviated in the same manner, of course, but, typically, the user does not regard play in the longitudinal direction as a problem, but exclusively the circumstances that the tabletop may tilt about a longitudinal axis because of play in the transverse direction. To avoid a too great friction in the column, it may be directly expedient exclusively to make deformations on two opposed sides.

Although the embodiment shows a slide in the form of a bushing which also serves as a top frame to close the gap between two successive sections 2a, 2b, it will be appreciated that the invention may also be applied in connection with other forms of slides, e.g. brick-shaped slides and even in connection with adjustable slides, e.g. of the type where two elements slide on a mutual wedge face by means of an adjustment screw. Of course, the slides do not have to be connected with a top frame, which may be a separate element that is secured independently. It will moreover be appreciated that the invention may also be applied to other cross-sectional shapes than precisely rectangular cross-sections.

When a deformation is mentioned here, it will be appreciated that it is not necessarily a continuous deformation, but that it may very well be formed by several local deformations.

It will moreover be appreciated that the invention may also be used in lifting columns having several sections and for other purposes than precisely tables, of course. Just to mention a few other examples, the columns may be used in connection with adjustable beds or chairs. The columns may be formed by aluminium or steel profiles or a combination of such profiles.

The invention is particularly directed to electrically driven lifting columns where the drive unit may be an integrated part of the column or be a separate unit, but it will be appreciated that the invention may also be applied in connection with hydraulically, pneumatically or manually-adjustable columns, of course.

The invention claimed is:

1. A lifting column which comprises an outer hollow member defining an upper end; an inner hollow member which extends downwardly into the outer hollow member, the outer and inner hollow members being telescopically movable relative to one another; a slide member connected to the upper end of the outer member and extending downwardly and between the outer hollow member and the inner hollow member to reduce at least one of play and friction therebetween, the slide member including wall portions comprising a plurality of spaced, longitudinally-extending tongues which press against the inner hollow member, and the outer hollow member including an inwardly-extending deformation to press the slide member against the inner hollow member; and an electrically driven spindle/nut unit connected to the lifting column for moving the outer and inner hollow members relative to one another.

2. The lifting column according to claim 1, wherein the outer hollow member includes an inwardly-extending deformation for each of said plurality of tongues.

3. The adjustable table according to claim 1, wherein the outer hollow member includes an inwardly-extending deformation for each of said plurality of tongues.

4. An adjustable table which comprises a table top, a foot member and a lifting column which extends between the foot member and the table top, and an electrically driven spindle/nut unit connected to said lifting column, said lifting column comprising an outer hollow member defining an upper end, an inner hollow member which extends downwardly into the outer hollow member, the outer and inner hollow members being telescopically movable relative to one another, and a slide member connected to the upper end of the outer member and extending downwardly and between the outer hollow member and the inner hollow member to reduce at least one of play and friction therebetween, the slide member wall portions comprising a plurality of spaced, longitudinally-extending tongues which press against the inner hollow member, and the outer hollow member including inwardly-extending deformations to press the slide member against the inner hollow member.

5. A method of manufacturing a lifting column comprising the steps of
   (a) positioning one end of an inner section of a pipe profile and one end of an outer section of a pipe profile in a telescopic relationship so as to provide a gap therebetween,
   (b) positioning a slide member in said gap and attaching said slide member to one of said inner and outer sections, and thereafter
   (c) providing a backstop outside of said outer section or inside of said inner section, and
   (d) forming an outerwardly-extending deformation in said inner section when said backstop is outside said outer section or an inwardly-extending deformation in said outer section when said backstop is inside said inner section to urge said slide member against the other of said inner and outer sections.

6. A lifting column which comprises an outer hollow member; an inner hollow member which extends downwardly into the outer hollow member and defines a lower end, the outer and inner hollow members being telescopically movable relative to one another; a slide member connected to the lower end of the inner member and extending upwardly and between the outer hollow member and the inner hollow member to reduce at least one of play and friction therebetween, the slide member including wall portions which press against the outer hollow member, and the inner hollow member including an outwardly-extending deformation to press the slide member against the outer hollow member; and an electrically driven spindle/nut unit connected to the lifting column for moving the outer and inner hollow members relative to one another.

* * * * *